Feb. 23, 1932.  E. V. TAYLOR  1,846,161
BRAKE
Filed April 11, 1929   2 Sheets-Sheet 1

INVENTOR
EUGENE V. TAYLOR
BY
ATTORNEY

Feb. 23, 1932.  E. V. TAYLOR  1,846,161
BRAKE
Filed April 11, 1929   2 Sheets-Sheet 2

INVENTOR
EUGENE V. TAYLOR
BY
ATTORNEY

Patented Feb. 23, 1932

1,846,161

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed April 11, 1929. Serial No. 354,210.

This invention relates to brakes and is illustrated as embodied in an internal expanding brake for an automobile wheel.

An object of the invention is to provide a brake of this type employing a plurality of connected shoes or equivalent friction means and to actuate said shoes into drum engagement by a novel floating cam having a wedging engagement with the shoes and which is rotatable about an axis which is parallel to the plane of friction elements.

A further object of the invention contemplates the provision of a novel bracket or bearing support for the rotatable cam, which bracket is provided with spaced ears or flanges through which is passed a pivot pin upon which the cam rotates, the bracket also being supported by a single pivot pin about which it rotates.

A further feature of the invention resides in the combination of my novel cam with a flexible control element anchored thereto, which flexible element enables the cam to float, while performing its function of rotating the cam and thus equalize the pressure applied to the friction elements.

Figure 1:
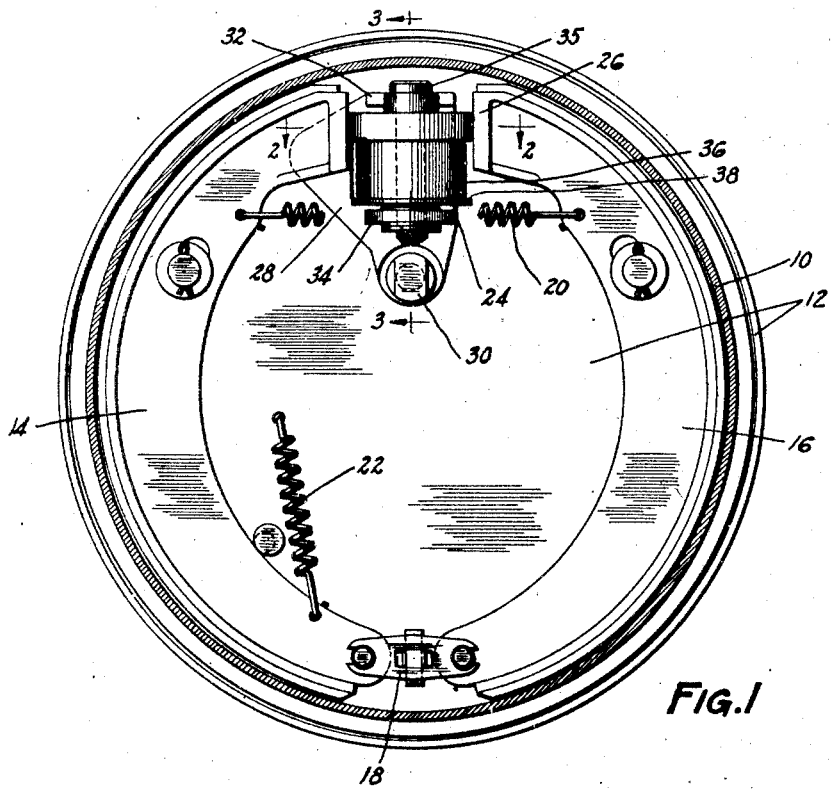
Figure 2:
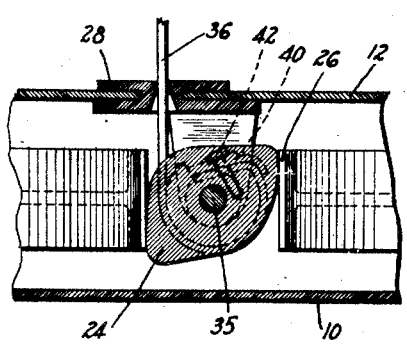
Figure 3:
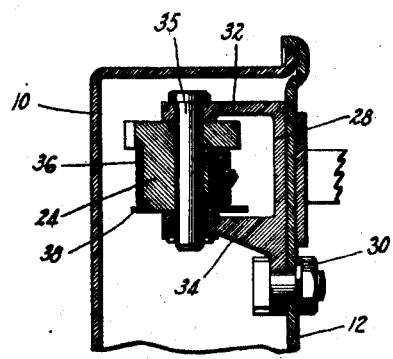
Figure 4:
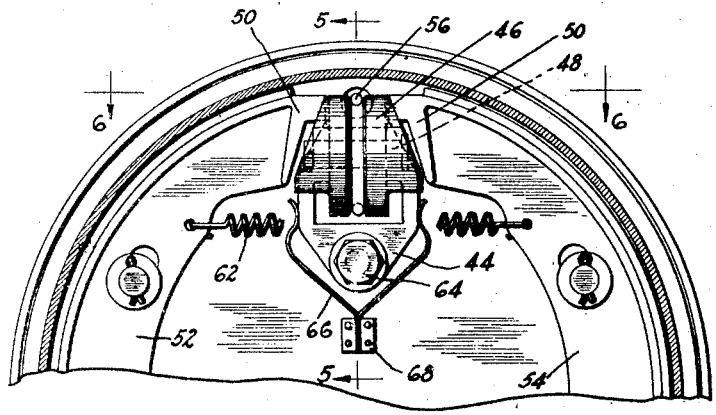
Figures 5, 6:
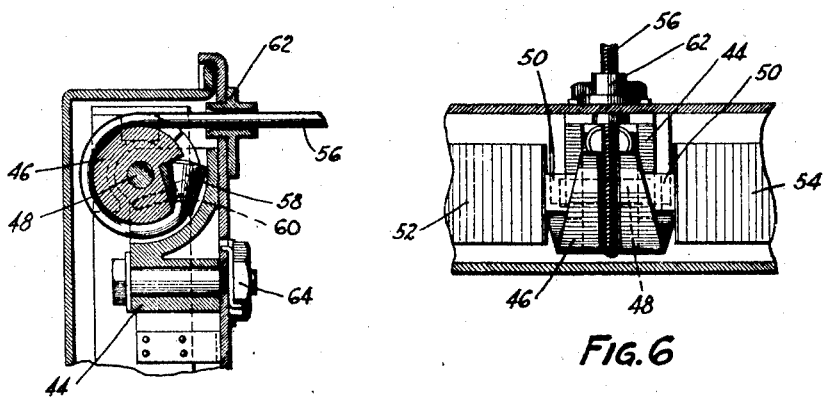

Various other features of my invention reside in the specific mounting of the rotatable cam; in the specific details of the cam per se; in the details of the flexible control, and to various other features of construction and combinations of parts which will become apparent from the following detailed description of certain preferred embodiments of my invention illustrated in the accompanying drawings, in which:

Figure 1 is a vertical sectional view of an internal brake employing my novel cam applying structure, which section is taken through the brake drum just inside the head thereof;

Figures 2 and 3 are sections through the applying means taken respectively on the lines 2—2 and 3—3 of Figure 1;

Figure 4 is a fragmentary view similar to Figure 1 indicating a modified form of my invention; and Figures 5 and 6 are sectional views detailing the modified form of applying means shown in Figure 4 and taken respectively on lines 5—5 and 6—6 of said figure.

In that embodiment of my invention illustrated in Figures 1, 2 and 3 there is disclosed the usual brake drum 10 secured to a rotatable wheel (not shown). At the open side of the drum there is provided the brake support or backing plate 12 upon which is secured the brake proper which may comprise two brake shoes 14 and 16 connected by a floating adjustable pivot 18 and adapted to be spread apart into drum engagement by my novel applying means positioned intermediate the spaced apart ends of the shoes. Return springs 20 and 22 serve to return the shoes to their inoperative position upon release of the applying means.

As clearly disclosed in Figures 2 and 3, I have provided a novel two-lobed cam 24, each lobe adapted to wedgingly engage a flat thrust plate 26 at the end of each T-sectioned brake shoe. The cam is arranged to move about an axis which is substantially perpendicular to the ground and parallel to the backing plate and to this end I provide an irregularly-shaped cam carrier bracket 28 pivotally secured to the backing plate 12 by a single bolt 30 and provided with laterally projecting spaced ears 32 and 34 serving as bearings for a pivot pin 35 passing therethrough and also through the longitudinal center of the aforementioned cam.

A flexible steel ribbon 36 is preferably employed to rotate the cam to spread the shoes into drum engagement, which ribbon may lie within a circular recess or groove 38 in the side face of the cam and which may be anchored to the cam at its end by anchor plate 40, an anchor screw 42 passing through both plate and ribbon into the body of the cam. The flexible ribbon 36 is wound around the cam and passes out of the brake through a flared opening in the carrier bracket all as clearly disclosed in Figure 2.

In operation with rotation of the cam about its vertical axis the shoes are spread apart into drum engagement, the pressures to the respective shoes being equalized by the floating characteristic of the pivotally supported cam carrier bracket.

Passing now to that embodiment of my invention disclosed in Figures 4, 5 and 6, the cam applying mechanism comprises a generally rectangular cam carrier bracket 44 deeply recessed at one side to provide a housing for a cylindrically shaped cam 46. The cam may be supported within the bracket by a pivot pin or spindle 48 extending through the longitudinal center of the cam substantially parallel to the backing plate and ground and journaled in bearings formed by the sides of the bracket.

The cam may be tapered as clearly shown in Figure 6 to contact, upon revolution thereof, beveled projections on thrust plates 50 on the ends of the spaced apart brake shoe members 52 and 54. The cam is preferably rotated into engagement with the friction elements of the brake by means of a flexible cable 56 wrapped about the cam within a groove therein and anchored at its end to a conical plug 58 secured to the body of the cam by a screw 60 passing through the plug and a conical reinforcing sleeve therefor. The anchor plug and its sleeve may be seated within a suitably shaped recess in the cam as disclosed in Figure 5.

In operation, pull upon the cable serves to rotate the cam against the resistance of return spring 62 secured to the shoes. The shoes are spread apart by the wedging action of the tapered cam face, the applying pressures to the two shoes being equalized by virture of the pivoting of the carrier bracket about pivot pin 64 securing the bracket to the backing plate. Leaf springs 66 may be bracketed to the backing plate at 68, which springs function to supplement the action of the return spring 62 in returning the shoes and cam to their inoperative positions.

In both modifications of my invention, the cam is rotated by the flexible cable which is connected by suitable fixtures to the brake service pedal, the cable passing through a flared fitting 62 in the backing plate. With the brake mounted upon a front or other dirigible wheel axle roll, steering movement and chassis movement taken up by the springs are all compensated for by the flexible control tension element operating my novel brake. The flexible control whether ribbon or cable also permits the floating of the cam to equalize the applying pressures to the two shoes.

While several illustrative embodiments have been described in detail, it is not my intention to limit the scope of the invention to those particular embodiments, or otherwise than by the terms of the appended claims.

I claim:

1. A brake comprising, in combination, a rotatable drum and a stationary brake support plate at the open side of said drum, friction elements within the drum supported by said plate and applying means for said elements comprising a floating bracket member rotatably supporting a cam movable about an axis substantially parallel to the plane of said support plate.

2. A brake comprising, in combination, a rotatable drum and a stationary brake support plate at the open side of said drum, friction elements within the drum supported by said plate and applying means for said elements comprising a floating bracket member rotatably supporting a cam movable about an axis substantially parallel to the plane of said support plate, in combination with a flexible tension element anchored to said cam and adapted to rotate the same.

3. A brake comprising, in combination, spaced apart friction elements actuated by a rotatable cam arranged to spread said elements apart to apply the brake, said cam being mounted on a spindle journaled within bearings in a pivotally mounted bracket member, in combination with a flexible tension element anchored to said cam and arranged to actuate the same.

4. A brake structure having a stationary support plate, in combination with a bracket member pivoted to said plate and rotatably supporting a cam member movable about an axis substantially parallel to said plate, in combination with a flexible tension element passing through said plate and connected to the cam to rotate the same.

5. A brake structure having a stationary support plate, in combination with a one piece bracket member pivoted to said plate and rotatably supporting a cam member movable about an axis substantially parallel to said plate, in combination with a flexible tension element passing through said plate and anchored to the cam to rotate the same.

6. Operating mechanism for a brake comprising a support plate having a bracket member pivotally mounted thereon, said bracket provided with vertically arranged spaced bearings journaling the spindle of a cam member, whereby said cam may rotate about a radially extending axis substantially parallel to the plane of said support.

7. Operating mechanism for a brake comprising a support plate having a bracket member pivotally mounted thereon, said bracket provided with vertically arranged spaced bearings journaling the spindle of a cam member, whereby said cam may rotate about a radially extending axis substantially parallel to the plane of said support, in combination with a flexible ribbon member wrapped about the cam and anchored thereto.

8. Operating mechanism for a brake comprising a brake support plate, a two-lobed cam rotatably supported by a floating carrier bracket and movable about an axis substantially parallel to said plate, in combination with operating means for said cam comprising a flexible tension element anchored to said cam and wound about and seated within a groove in said cam.

9. Operating mechanism for a brake comprising a brake support plate, a two-lobed cam rotatably supported by a floating carrier bracket and movable about an axis substantially parallel to said plate, in combination with operating means for said cam comprising a flexible flat ribbon member anchored to said cam and wound about and seated within a channel groove in said cam, said bracket extended to form a bearing for said ribbon member.

10. Operating mechanism for a brake supported on a stationary plate member comprising, in combination, a recessed bracket member housing a cam element rotatable within said recess, said cam characterized by its tapered body which presents inclined side faces to driven means adapted to contact therewith.

11. Operating mechanism for a brake supported on a stationary backing plate including a recessed bracket member pivotally supported by said plate, said bracket rotatably supporting a cam housed within said recess and movable about an axis substantially parallel to said backing plate.

12. Operating mechanism for a brake supported on a stationary backing plate including a recessed bracket member pivotally supported by said plate, said bracket rotatably supporting a generally cylindrical cam housed within said recess and movable about an axis substantially parallel to said backing plate, said cam presenting inclined side faces to elements to be actuated thereby.

13. In combination, a brake drum, shoes to engage the drum, expanding means to effect said engagement, carrier means rotatably supporting said expanding means, a pivot for said carrier, U-shaped spring means having arms engaging opposite faces of said carrier whereby said spring is tensioned by movement of said carrier about its pivot.

14. In combination, a brake drum, shoes to engage the drum, expanding means to effect said engagement, a carrier rotatably supporting said expanding means, a pivot to permit said carrier to swing and carry said expanding means bodily while the latter is acting to expand said shoes, said carrier having opposed faces, U-shaped spring means having arms engaging said faces whereby when said carrier turns on its pivot its opposed faces expand the said spring arms, and whereby the energy thereby stored in the spring functions to restore the carrier to centralized position.

In testimony whereof, I have hereunto signed my name.

EUGENE V. TAYLOR.